United States Patent
Gilan et al.

(10) Patent No.: US 10,919,224 B2
(45) Date of Patent: Feb. 16, 2021

(54) LEVELING SYSTEM FOR 3D PRINTER

(71) Applicant: IO Tech Group, Ltd., London (GB)

(72) Inventors: Ziv Gilan, Kfar-harif (IL); Daniel Liptz, Jerusalem (IL); Michael Zenou, Jerusalem (IL)

(73) Assignee: IO Tech Group, Ltd., London (GB)

( * ) Notice: Subject to any disclaimer, the term of this patent is extended or adjusted under 35 U.S.C. 154(b) by 112 days.

(21) Appl. No.: 16/509,121

(22) Filed: Jul. 11, 2019

(65) Prior Publication Data

US 2020/0023582 A1 Jan. 23, 2020

Related U.S. Application Data

(60) Provisional application No. 62/699,085, filed on Jul. 17, 2018.

(51) Int. Cl.
| | | |
|---|---|---|
| *B29C 64/245* | (2017.01) | |
| *B29C 64/268* | (2017.01) | |
| *B29C 64/379* | (2017.01) | |
| *B33Y 30/00* | (2015.01) | |
| *B33Y 40/00* | (2020.01) | |

(52) U.S. Cl.
CPC .......... *B29C 64/245* (2017.08); *B29C 64/268* (2017.08); *B29C 64/379* (2017.08); *B33Y 30/00* (2014.12); *B33Y 40/00* (2014.12)

(58) Field of Classification Search
CPC ... B29C 64/245; B29C 64/379; B29C 64/268; B29C 64/232; B33Y 30/00; B33Y 40/00
See application file for complete search history.

(56) References Cited

U.S. PATENT DOCUMENTS

| | | |
|---|---|---|
| 6,122,036 A | 9/2000 | Yamasaki et al. |
| 2005/0109743 A1 | 5/2005 | Tanabe et al. |
| (Continued) | | |

FOREIGN PATENT DOCUMENTS

| | | |
|---|---|---|
| EP | 3219412 A1 | 9/2017 |
| WO | 2016063270 A1 | 4/2016 |
| WO | 2016198291 A1 | 12/2016 |

OTHER PUBLICATIONS

International Search Report and Written Opinion dated Oct. 30, 2019, from the ISA/European Patent Office, for International Patent Application No. PCT/IB2019/055941 (filed Jul. 11, 2019), 18 pages.

(Continued)

*Primary Examiner* — Nahida Sultana
(74) *Attorney, Agent, or Firm* — Ascenda Law Group, PC

(57) ABSTRACT

A leveling system for a 3D printing system for laser dispensing includes inner and outer frames, each supported at its corners by respective actuators of first and second sets of actuators. The outer frame supports an optical plane within which material to be dispensed by laser irradiation is disposed. The inner frame supports a receiving medium plane within which a substrate on which said material to be dispensed by laser irradiation is disposed. Each actuator operates independently to displace a respective frame corner in the vertical direction. The inner and outer frames each is attached at their respective corners to a respective actuator by a rod, thus allowing the inner and outer frames to freely rotate with respect to one another. An additional frame may support sensors for monitoring the 3D printing system.

6 Claims, 8 Drawing Sheets

(56) References Cited

U.S. PATENT DOCUMENTS

| | | | |
|---|---|---|---|
| 2017/0080641 A1* | 3/2017 | El-Siblani | B33Y 10/00 |
| 2019/0217532 A1* | 7/2019 | Schroeder | B29C 64/30 |
| 2019/0381566 A1* | 12/2019 | De Chirico | B23K 26/342 |
| 2020/0282593 A1* | 9/2020 | Le Roux | B28C 9/0463 |
| 2020/0391438 A1* | 12/2020 | Costabeber | B29C 64/255 |

OTHER PUBLICATIONS

Zenou; et al., "Digital laser printing of aluminum micro-structure on thermally sensitive substrates", Journal of Physics D: Applied Physics Institute of Physics Publishing Ltd (Apr. 16, 2015), 48(20):205303, 12 pages.

Written Opinion of the International Preliminary Examining Authority dated Jun. 25, 2020, from the IPEA/European Patent Office, for International Patent Application No. PCT/IB2019/055941 (filed Jul. 11, 2019), 7 pages.

International Preliminary Report on Patentability dated Oct. 5, 2020, from the IPEA/European Patent Office, for International Patent Application No. PCT/IB2019/055941 (filed Jul. 11, 2019), 22 pgs.

\* cited by examiner

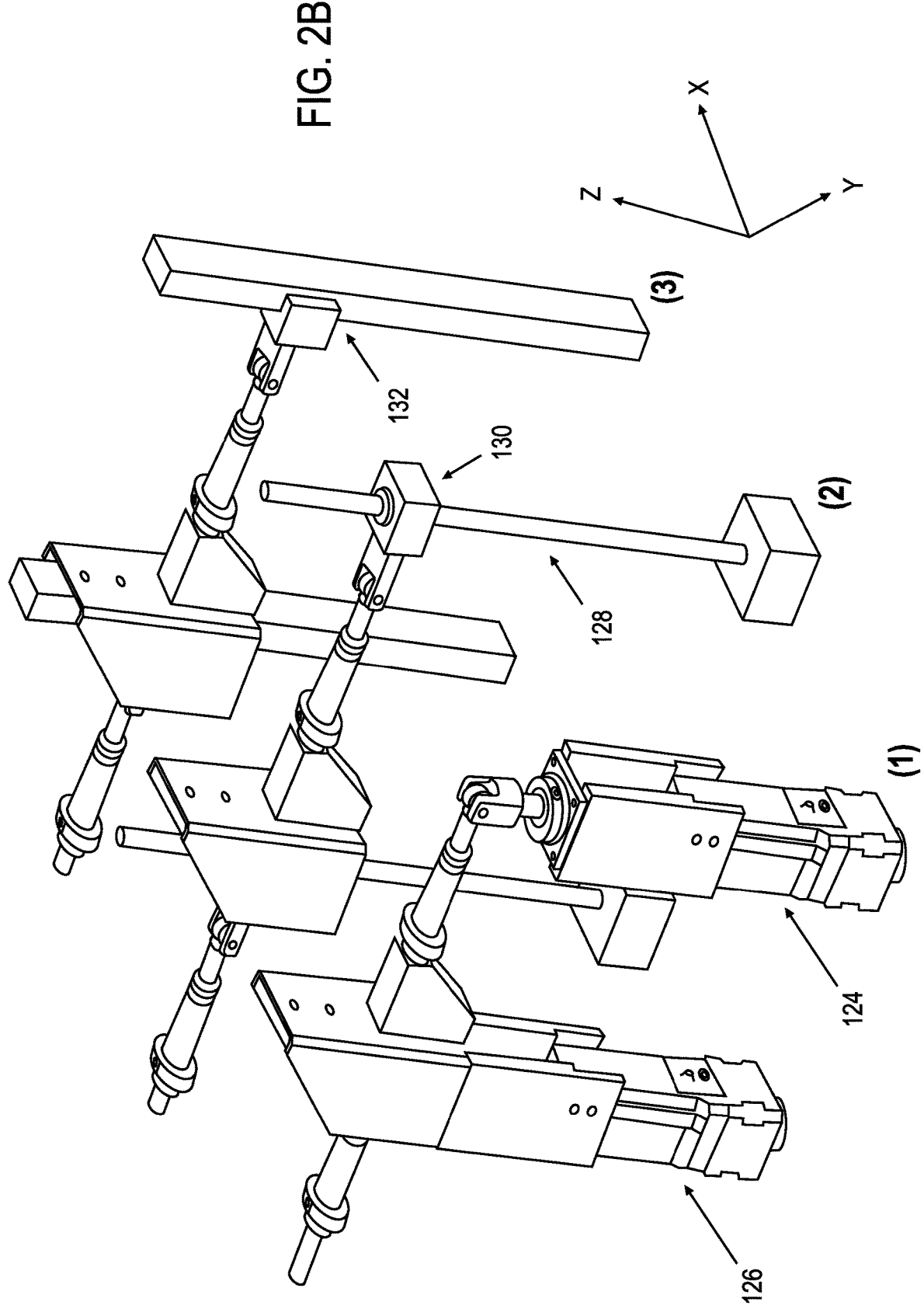

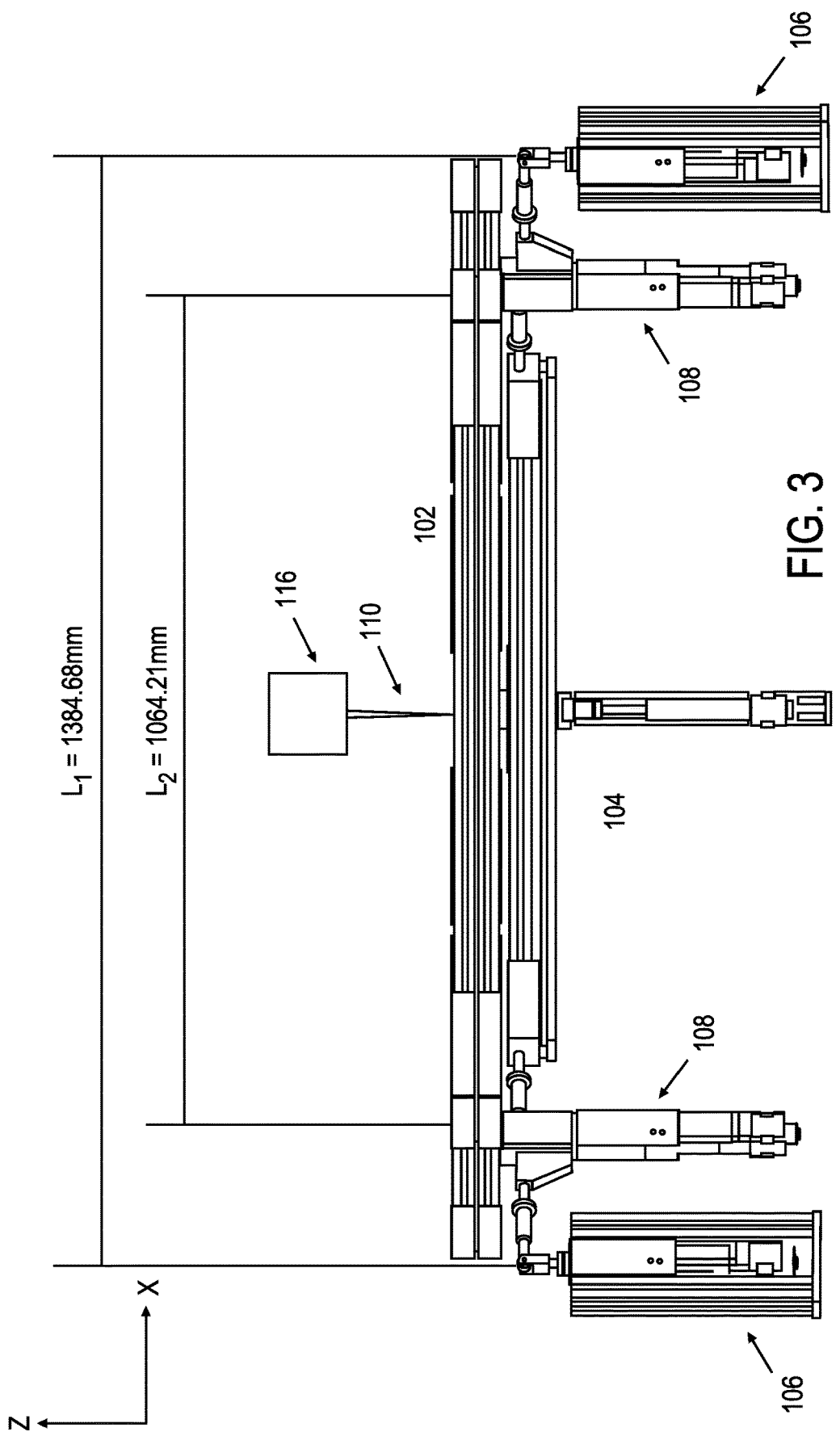

LEVELING SYSTEM FOR 3D PRINTER

RELATED APPLICATIONS

This is a NONPROVISIONAL of U.S. Provisional Application 62/699,085, filed 17 Jul. 2018, incorporated herein by reference.

FIELD OF THE INVENTION

The present invention relates to a system that uses vertical linear actuators at the corners of two frames to ensure parallelism and to control the gap between working planes in a three dimensional ("3D") printing system for laser dispensing.

BACKGROUND

Within the field of 3D printing there exist a number of drop-on-demand (DOD) printing techniques, some of which involve the fabrication of two-dimensional ("2D") or 3D objects from digital data files under computer control. In general, these techniques rely on piezoelectric and/or thermal actuators to eject small amounts (droplets) of liquid (ink) through a nozzle. While these processes may work well for some inks, they tend not to be well-suited for high viscosity inks which often clog the small nozzles. Accordingly, methods and apparatus that employ lasers to create droplets from donor materials have been developed. These droplets, when solidified in the aggregate, form 2D or 3D patterns or structures on receiver mediums.

An example of a laser-based DOD printing apparatus is shown in FIG. 7A. In this approach, a focused laser beam 10 is made incident upon a thin layer of ink 12 at a small working area 14. The laser heats the ink in the vicinity of the working area 14, causing a droplet 16 to be jetted towards a receiver medium 30. The thin layer of ink 12 is transported laterally with respect to the stationary laser on an intermediary layer 18 (a carrier). The energy absorbed by the intermediate layer partially heats the liquid part of the ink and creates a micro-vapor bubble. The bubble is thermodynamically responsible for the droplet jetting. A transparent substrate material 20 may be positioned on the side of the intermediary layer opposite the ink layer to ensure the thin layer used as a transport medium does not bend or break.

FIG. 7B illustrates a more recent jetting arrangement by the present inventor. Here, a focused laser beam 10 is made incident upon a thin layer of ink at a small working area. In this arrangement, however, the thin layer of ink is transported into the working area using a mesh-like screen 22 with small holes or other openings 26 therein arranged in a periodic fashion. In operation, the laser is focused onto an opening 26 (or an area adjacent to an opening) through a transparent substrate 20 and the ink within the opening is heated, causing a droplet 24 to be jetted towards a receiver medium 30. Droplet 24 is approximately the same size as opening 26 and has a volume approximately equal to the volume of ink contained within the opening 26. The ink, which is typically a highly viscous material (e.g., >50 mPa s) such as a viscous liquid (e.g., a polymer, curable resin, etc.) or nanoparticle suspension, is coated onto the screen 22 in a uniform layer (with any excess being removed prior to exposure to the laser), and is retained within the openings 26 through adhesion to the mesh surfaces and surface tension. The mesh screen 22 is retained under tension (e.g., lateral strain with respect to the plane of the screen) 28 as it is transported through the working area by one or more actuators.

Printing with laser dispensing, as in the above-described examples and other arrangements, requires maintaining gaps on the order of no more than a few hundreds of micrometers between the donor material (e.g., carrier 18 with ink layer 12 in FIG. 7A or screen 22 in FIG. 7B) and the substrate (e.g., receiver medium 30 in FIGS. 7A and 7B). For large size object printing it is difficult to ensure this level of parallelism across the entire print area.

SUMMARY OF THE INVENTION

In one embodiment of the invention, a leveling system for a 3D printing system for laser dispensing includes an outer frame supported at its corners by respective actuators of a first set of actuators, the outer frame supporting an optical plane within which material to be dispensed by laser irradiation is disposed; and an inner frame supported at its corners by respective actuators of a second set of actuators, the inner frame being supported by said outer frame and supporting a receiving medium plane within which a substrate on which said material to be dispensed by laser irradiation is disposed. Each of the actuators of the first and second sets is configured to be operated independently, under the control of a controller, to displace a respective corner of one of the inner or outer frames in a direction orthogonal to a reference frame on which the leveling system rests. In one instance, each of the inner and outer frames has three corners, spaced 120° from one another. Additionally, in some cases the inner frame and the outer frame each may be attached at its corners to a respective actuator by a respective one of a plurality of rods, thus allowing the inner and outer frames to be free to rotate with respect to one another around axes defined by the rods attaching respective corners of the inner and outer frames to respective ones of the actuators. The leveling system may also include an additional frame supported at its corners by respective actuators of a third set of actuators, where the additional frame supports one or more sensors for monitoring the 3D printing system.

BRIEF DESCRIPTION OF THE DRAWINGS

The present invention is illustrated by way of example, and not limitation, in the figures of the accompanying drawings, in which:

FIG. 2B shows alternatives for actuators that may be used to control the displacement of the frames in the vertical direction in accordance with various embodiments of the invention.

FIG. 3 illustrates the calculation of precision of angular control in accordance with one embodiment of the invention.

DESCRIPTION OF THE INVENTION

The proposed leveling system provides a plurality of sets of vertically oriented linear actuators which move the corners of two frames of a 3D printing apparatus independently of one another. In one embodiment, two sets of three vertically oriented linear actuators move the corners of the two frames. In other embodiments, additional sets or individual ones of actuators may be used at points between the corners of the frames, that is, along the frame members, for example in cases where the frames have members with articulating joints between the corners, or where the brittleness, malleability, ductility, or weight of the frame members warrants the use of additional actuators along their lengths. One of the frames supports the optical plane of the 3D printing system, which holds the material to be printed. The other frame supports the substrate on which the material is printed. The system provides accurate control of the distance between these two planes in the vertical direction, i.e., the direction defining the gap between the two planes, and between them and other points in the vertical direction, as well as maintaining parallelism between the two planes.

Figures 7A, 7B:
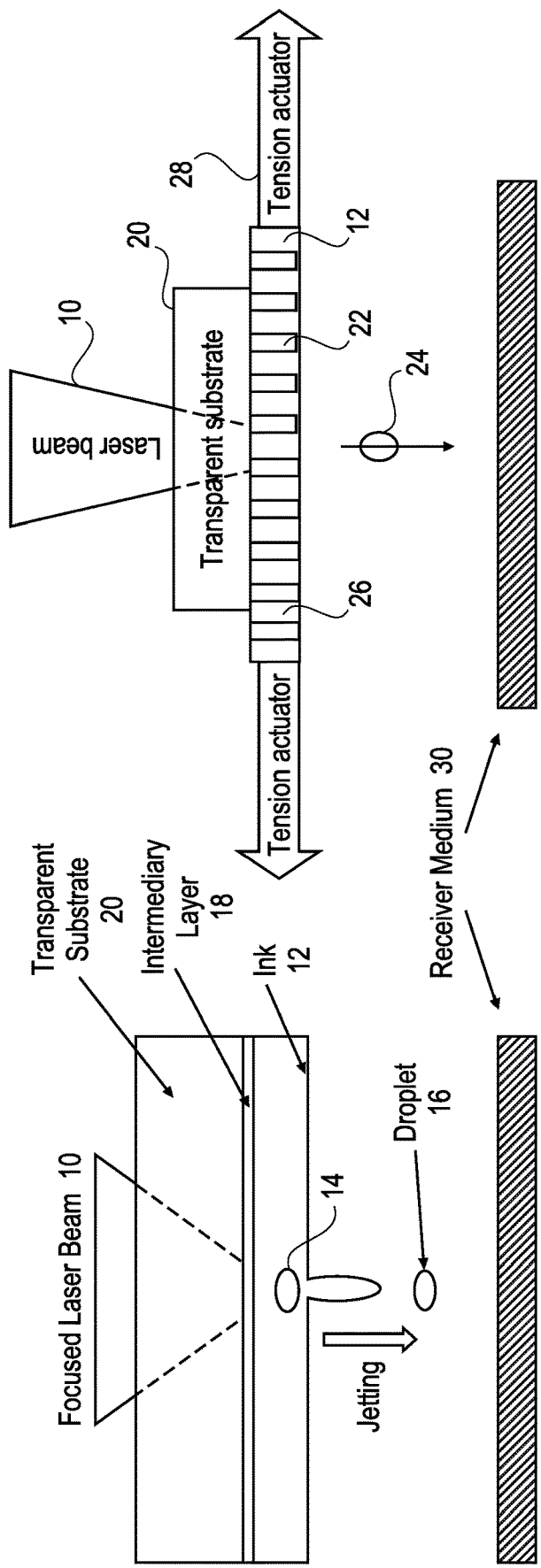
FIGS. 7A and 7B illustrate examples of laser-based 3D printing apparatus.

As is apparent from the illustrations in FIGS. 7A and 7B, 3D printing using laser dispensing technology involves multiple working planes: an optical plane on which the laser beam is focused and where the material for printing (e.g., ink) is stored, and the receiving medium, which lies in a plane on which the material is deposited during printing. In many systems there is also a sensor plane in which cameras (or other imaging devices), and distance and other sensors are positioned. Maintaining parallelism (or other defined relationships) between these various working planes and controlling the distance(s) between them presents a significant challenge to printing at high resolutions. For example, ineffective control over these distances may result in the laser not focusing properly on the optical plane, printing may be compromised by the gap between the optical plane and the receiving medium being too small or large, or the sensors may move out of their calibrated locations. The proposed leveling system has the following advantages:
  a. It passively maintains a fixed vertical gap between the optical plane and the printing plane (i.e., the plane of the receiving medium).
  b. The 120° separation between the vertical actuators, as provided in one embodiment, ensures that lateral forces will not move the frame out of its x-y position.
  c. The control of angles of each plane in θ (altitude) and ϕ (azimuthal) directions in one embodiment is accurate to within 0.006° or less.
  d. The same actuators control both z (vertical) position and angle.
  e. It provides active control of the vertical position of planes with respect to the laser and with respect to each other.
  f. It maintains parallelism of the respective planes to ensure precise printing and accurate sensor readings.
  g. It leaves a central area of the system open to allow the laser beam to pass unobstructed.
  h. Rod end joints allow for free rotation of the frames even if the actuators are not all moved together.
  i. It provides reliable, accurate levelling of the working planes at low cost.

Figure 1:
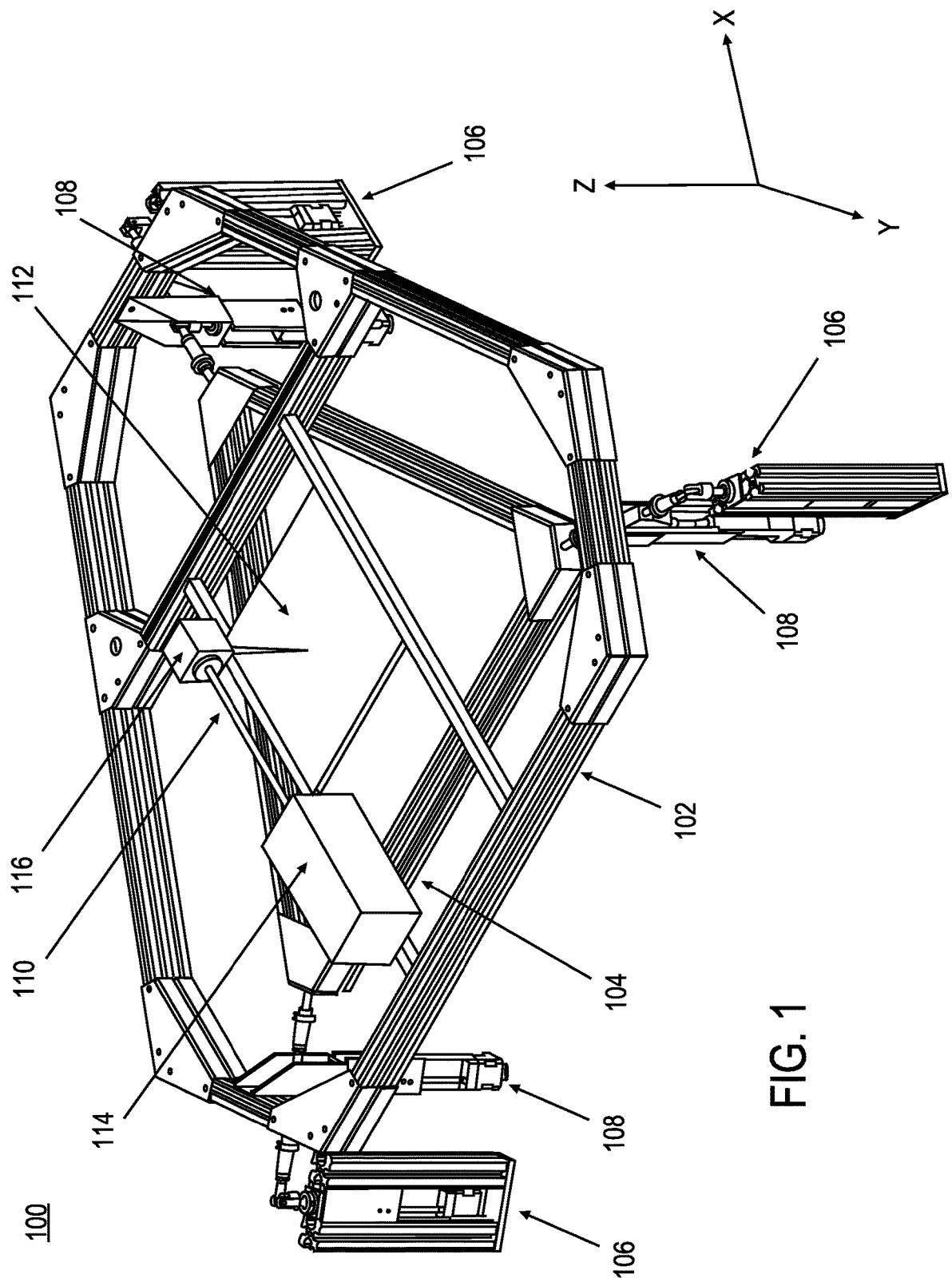
FIG. 1 shows an overview of a system for positioning frames of a 3D printer in accordance with one embodiment of the invention.

The system consists of two frames used in a laser dispensing (e.g., Light Initiated Fabrication Technology ("LIFT")) 3D printer. Referring to FIG. 1, an example of a leveling system 100 in accordance with an embodiment of the present invention is shown. Leveling system 100 includes a pair of frames 102, 104 and a plurality of actuators 106, 108, in this case three per frame, each positioned at a respective corner of one of the frames. A first one of the frames 102 supports the optical plane, which holds the material to be printed. A second one of the frames 104 is supported by the first frame and holds the substrate (receiving medium) on which objects are printed. The first, or outer, frame 102 is acted upon by three actuators 106 located at the corners, spaced 120° from one another, which move the corners in the vertical direction (that is, in a direction orthogonal to a reference plane on which the entire system 100 rests). The second, or inner, frame 104 is similarly acted upon by another set of three actuators 108. The area inside the outer frame is kept empty to provide space for the laser beam 110 to pass and for the print area 112 where the printing takes place. In this example, a laser 114 produces laser beam 110 which is directed to the print area 112 by an optical arrangement (e.g., a scanning mirror) 116, however, in other arrangements a different configuration may be used.

Each of the actuators of each of the frames may be operated independently of the others. Operation of the actuators allows for control of several variables essential to printing. By operating only the actuators 108 of the inner frame 104, the gap between the optical plane and the substrate for printing can be changed. By operating only the actuators 106 of the outer frame 102, both the optical and the substrate planes can be moved with respect to the laser, or the sensor plane (not pictured). By operating two actuators of any one frame equal distances in opposite directions, the angle of the center of the frame is changed without affecting its position in the z-direction. By combining these movements, complete control of the z-position and angular orientation in the θ (altitude) and ϕ (azimuthal) directions is achieved. This control provides a simple solution for maintaining parallelism of the working planes.

Figure 6:
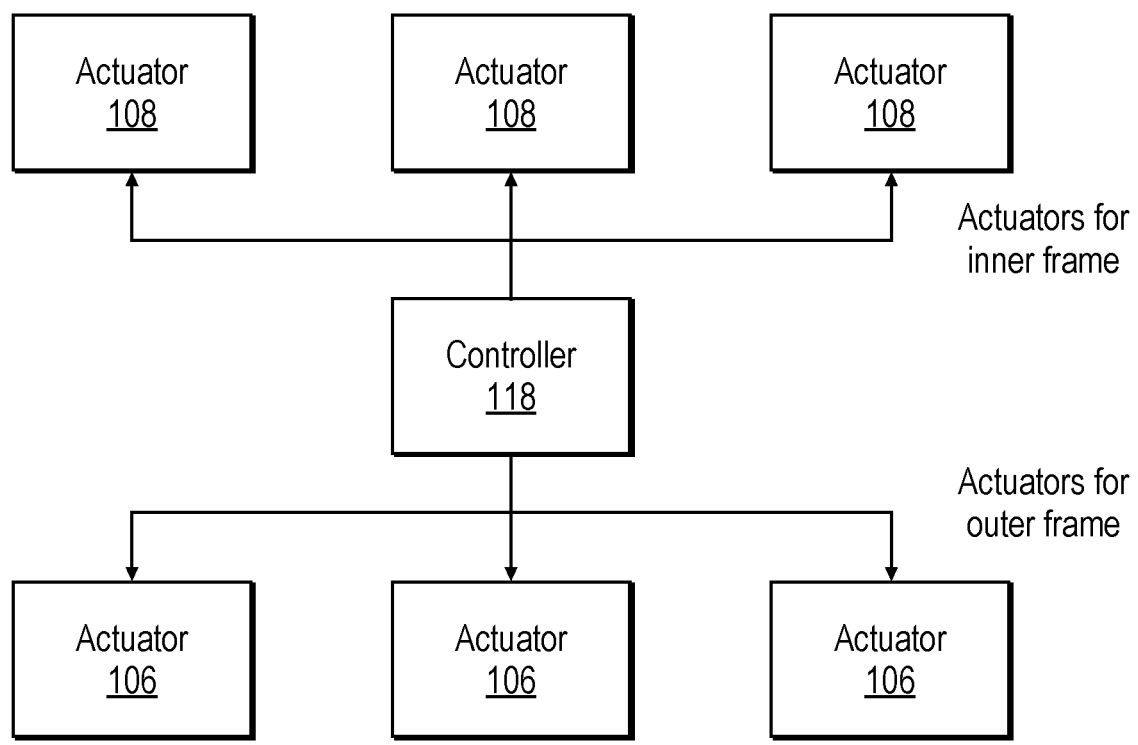
FIG. 6 shows the actuators operated by a processor-based controller in accordance with an embodiment of the invention.

As shown in FIG. 6, operation of any one or more of the actuators or either or both of the frames is achieved using a processor-based controller 118. Processor-based controller 118 upon or with which the methods of the present invention may be practiced will typically include a processor communicably coupled to a bus or other communication mechanism for communicating information; a main memory, such as a RAM or other dynamic storage device, coupled to the bus for storing information and instructions to be executed by the processor and for storing temporary variables or other intermediate information during execution of instructions to be executed by the processor; and a ROM or other static storage device coupled to the bus for storing static information and instructions for the processor. A storage device, such as a hard disk or solid-state drive, may also be included and coupled to the bus for storing information and instructions. The subject controller may, in some instances, include a display, coupled to the bus for displaying information to a user. In such instances, an input device, including alphanumeric and/or other keys, may also be coupled to the bus for communicating information and command selections to the processor. Other types of user input devices, such as cursor control devices may also be included and coupled to the bus for communicating direction information and command selections to the processor and for controlling cursor movement on the display.

The controller 118 may also include a communication interface coupled to the processor, which provides for two-way, wired and/or wireless data communication to/from the controller, for example, via a local area network (LAN). The communication interface sends and receives electrical, electromagnetic, or optical signals which carry digital data streams representing various types of information. For example, the controller may be networked with a remote unit (not shown) to provide data communication to a host computer or other equipment operated by a user. The controller can thus exchange messages and data with the remote unit, including diagnostic information to assist in troubleshooting errors, if needed.

In operation, the leveling system may be used for positioning the media and other components that make up the working planes of the 3D printer for forming a 3D article by fusion of droplets in forms defined by cross-sections of the object under construction. For example, a first layer of individual droplets may be distributed over a receiving medium which is maintained in a plane and position defined by the operation of actuators 108. This may be accomplished by depositing the droplets, which are produced from a donor medium which is maintained in a plane and position defined by the operation of actuators 106, while moving the receiving medium within its plane with respect to a nozzle area between successive droplets to form a relatively thin, approximately uniform layers of the donor medium (e.g., ink) on the receiving medium and, successively, on previously jetted layers. Once jetted, the droplets cool and solidify in place. Alternatively, entire layers may be printed at a time.

The controller 118 is programmed to cause the laser 114 to emit pulses, thereby creating droplets, at times corresponding to the necessary application of ink for forming the cross-section of the article under fabrication. This may be done, for example, by providing images of cross-sections, and ensuring that the droplets are jetted when a portion of the receiving medium is positioned, within the plane defined by the operation of actuators 108, within the print area 112 at a point for which material is needed. After each droplet is jetted, controller 118 causes the donor medium, the receiver medium, and/or the laser to translate in preparation for the next application of the laser pulse. For example, the controller may cause the receiving medium to be displaced relative to the print area to a next position at which a droplet is to be jetted. The fusion of droplets in locations on the receiving medium corresponding to the image of the cross-sectional layer of the object to be fabricated form an integral layer of ink having a shape corresponding to that image. In addition, supporting structures may be fabricated during production of the object and later removed. Successive layers of droplets are jetted on top of one another to complete the object. Alternatively, entire layers may be fabricated at a time, one on top of the other, until the object under fabrication is complete. Complex shapes may be fashioned by altering the angular displacement of the plane of the receiving medium with respect to the optical plane, for example through operation of two of the actuators 108.

Figure 2A:
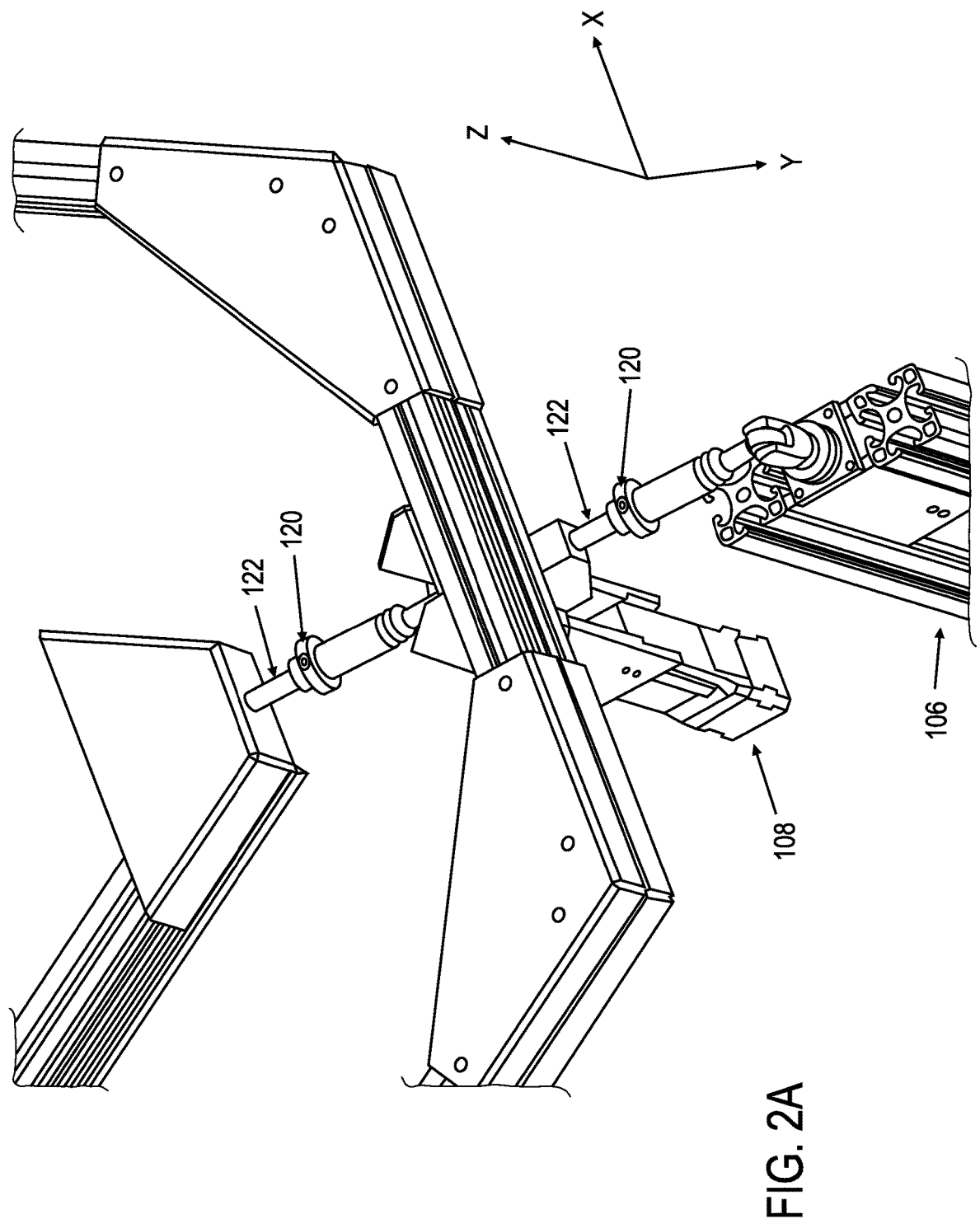
FIG. 2A provides a detailed view of vertical actuators for use in a system for positioning frames of a 3D printer and configured in accordance with one embodiment of the invention.

Referring to FIG. 2A, the use of rod ends 120 at the corners of the frames allows the frames to rotate freely about the x and y axes even if the three actuators are not moved by the same amount simultaneously. The positioning of the actuators at an angle of 120° from one another (per frame) ensures that even if a lateral force acts on the frame, it will not lose its position in the x- and y-directions. The legs supporting the actuators are fixed and the angle between the rod 122 and the frame is fixed. Even if a force is applied parallel to one of the rods, so it is free to slide, the other two rods will remain fixed and the x-y position of the frame will be maintained.

Referring to FIG. 2B, because of its size and construction, the system can control the angle of the working planes to a high degree of precision in the θ (altitude) and φ (azimuthal) directions. In one embodiment, shown in view (1), linear actuators 124, 126 can move the corners in the z-direction independently, for example in increments of 50 μm or better. Alternatively, the frames may be moved using a lead screw 128 and nut 130, as shown in view (2). Or, to achieve the desired level of precision, the frames may be moved using piezo translators 132 that include a piezo ceramic that expands in a defined direction upon application of an electric current (e.g., under the control of the controller 118), as shown in view (3). The use of the term "actuator" herein is intended to encompass any or all of these alternative means for displacing the frames in the vertical (z) dimension. In the case of the piezo translators, the ceramic may be orientated so that when it expands (at the application of a current under the control of the controller), the frame connected to the actuator is displaced along a single axis (e.g., the z-dimension), along the direction of the expansion of the crystal. Generally, a number of piezo translators may be used per actuator and the various piezo translators may be energized at the same time (or nearly so) so that their actions are coordinated with one another. Thus, the piezo translators may be arranged so that they impart longitudinal motion to the frame in the same direction and the translation distance may be proportional to the magnitude of the current applied to the piezo translators. The piezo translator(s) employed in embodiments of the present invention may be any of: longitudinal piezo actuators, in which an electric field in the ceramic is applied parallel to the direction of its polarization; piezoelectric shear actuators, in which the electric field in the ceramic is applied orthogonally to the direction of its polarization; or tube actuators, which are radially polarized and have electrodes are applied to an outer surfaces of the ceramic so that the field parallel to its polarization also runs in a radial direction.

Figure 4:
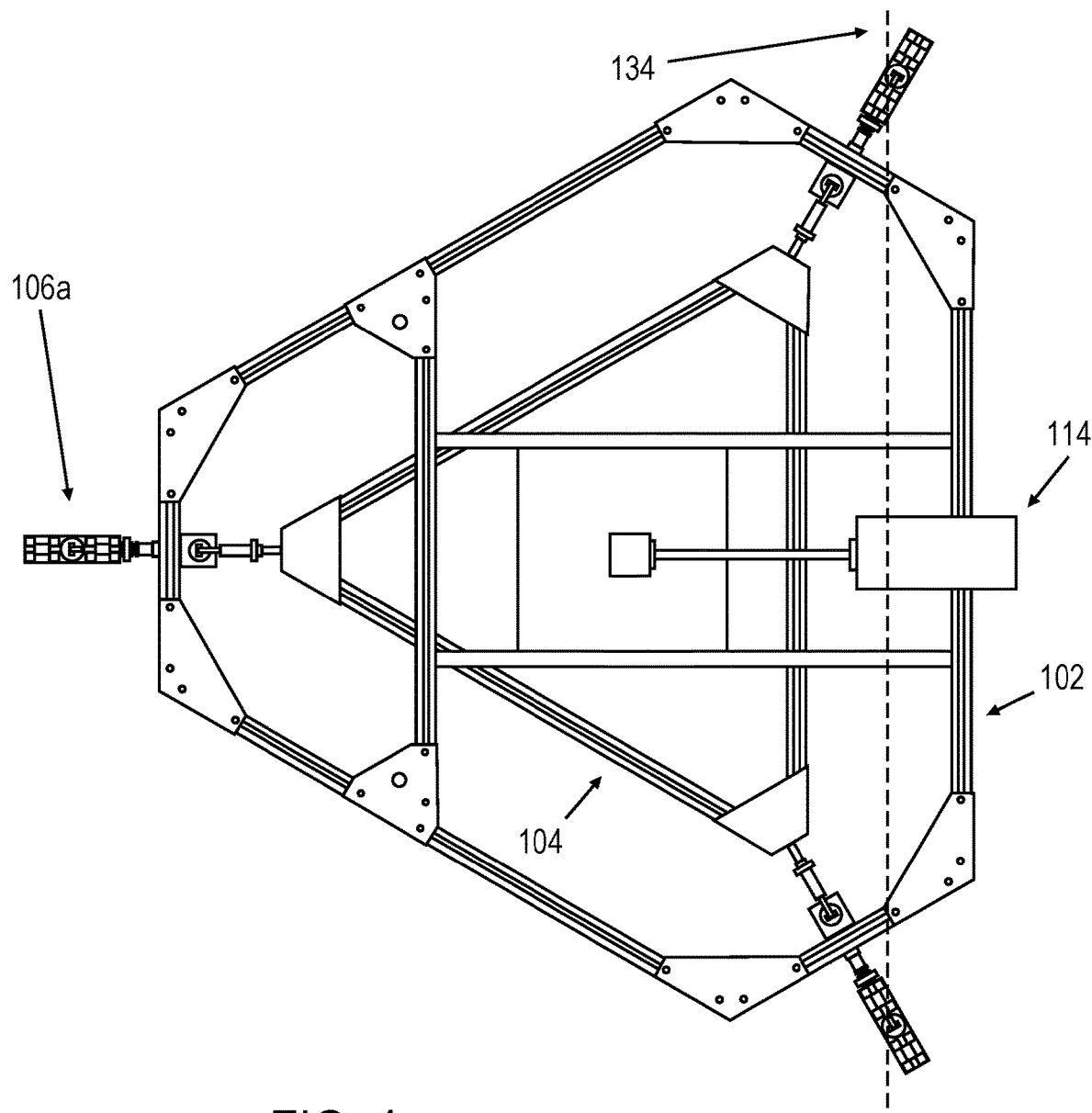
FIG. 4 is a top view of an axis of rotation in accordance with one embodiment of the invention.
Figure 5:
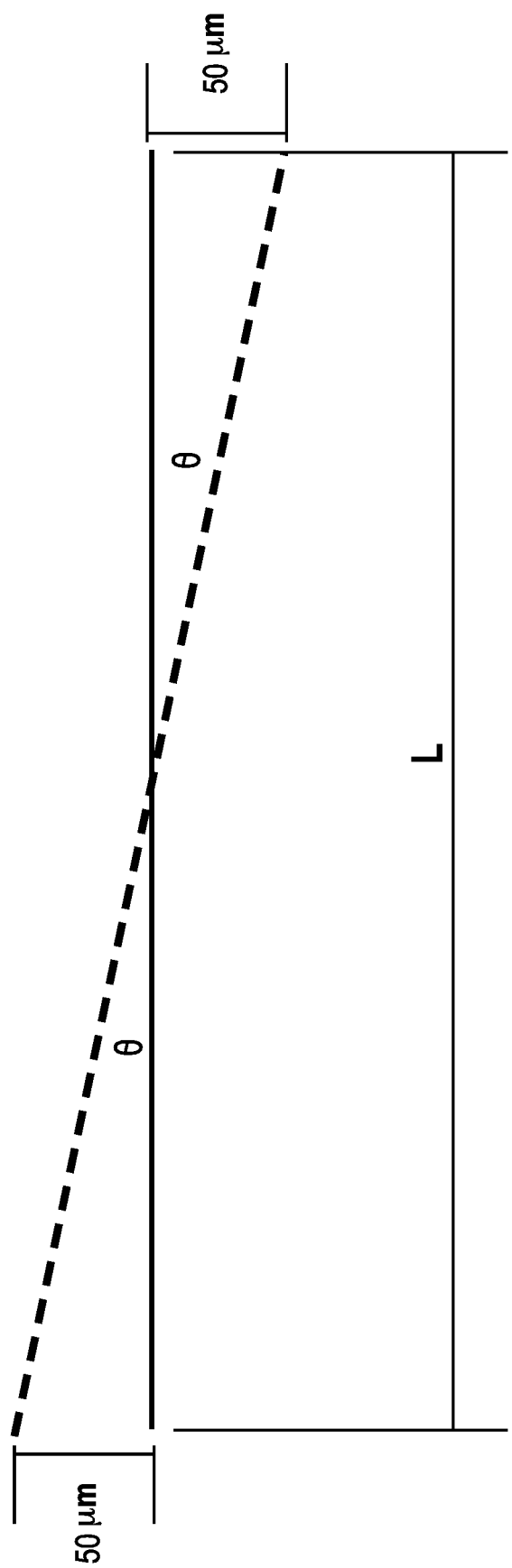
FIG. 5 shows a side view of rotation of working plane in accordance with one embodiment of the invention.

In one embodiment, illustrated in FIG. 3, the actuators 106 of the outer frame 102 are located 1384.68 mm from one another and those 108 of the inner frame 104 are separated by 1064.21 mm. Referring to FIG. 4, when only one corner is displaced trough action of an actuator 106*a*, the frame will rotate about an imaginary axis 134 that connects the rod ends of the other two corners. If one corner is raised by 50 μm and another lowered by 50 the z-position of the center of the frame will not change (see FIG. 5), and the change in angle is given by equations 1 and 2. The system can easily control the angle of the working planes to within 0.006°.

$$\theta_1 = \arctan\frac{50\ \mu m}{\frac{1}{2} \times 1384.68\ mm} = .0041° \qquad \text{Equation 1}$$

$$\theta_2 = \arctan\frac{50\ \mu m}{\frac{1}{2} \times 1064.21\ mm} = .0054° \qquad \text{Equation 2}$$

Thus, a system that uses vertical linear actuators at the corners of two frames to ensure parallelism and to control the gap between working planes in a 3D printing system for laser dispensing has been described.

What is claimed is:

1. A leveling system for a 3D printing system for laser dispensing, said leveling system comprising:
   a first frame supported at its corners by respective actuators of a first set of actuators, said first frame supporting an optical plane within which material dispensed by laser irradiation is disposed; and
   a second frame supported at its corners by respective actuators of a second set of actuators and by said respective actuators of said first set of actuators so as to passively maintain a fixed gap between said optical plane and a receiving medium plane and supporting said receiving medium plane within which a substrate on which said material dispensed by laser irradiation is disposed;
   wherein each of the actuators of the first and second sets is configured to be operated independently under the control of a controller to displace a respective corner of one of said first or second frame in a direction orthogonal to a reference frame on which the leveling system rests and maintain parallelism of the optical and receiving medium planes.

2. The leveling system of claim 1, wherein each of the first frame and the second frame has three corners, spaced 120° from one another.

3. The leveling system of claim 1, wherein each of the first frame and the second frame is attached at its corners to one of the respective actuators by a respective one of a plurality of rods, whereby the first and second frames are free to rotate with respect to one another around axes defined by said rods attaching respective corners of the first and second frames to respective ones of the actuators.

4. The leveling system of claim 1, further comprising an additional frame supported at its corners by respective actuators of a third set of actuators, said additional frame supporting one or more sensors for monitoring said 3D printing system.

5. A method of orienting components of a 3D printing system for laser dispensing, said method comprising:
   positioning corners of a first frame of a leveling system using respective actuators of a first set of actuators, said first frame supporting an optical plane within which material dispensed by laser irradiation is disposed;
   positioning corners of a second frame of the leveling system using respective actuators of a second set of actuators, said second frame supporting a receiving medium plane within which a substrate on which said material dispensed by laser irradiation is disposed; and
   operating each of the actuators of the first and second sets of actuators independently of one another by a controller so as to displace a respective corner of one of said first or second frame in a direction orthogonal to a reference frame on which the leveling system rests and maintain parallelism of the optical and receiving medium planes, wherein during said operating of the actuators, the first frame is supported at its corners by the respective actuators of the first set of actuators and the second frame is supported at its corners by the respective actuators of the second set of actuators and by said respective actuators of said first set of actuators so as to passively maintain a fixed gap between the optical and receiving medium planes.

6. The method of claim 5, wherein each of the first frame and the second frame is attached at its corners to one of the respective actuators by a respective one of a plurality of rods, and the method further includes operating the actuators of the first and second sets of actuators by the controller so as to rotate the first and second frames with respect to one another around one or more axes defined by said rods attaching respective corners of the first and second frames to respective one of the first and second sets of actuators.

* * * * *